United States Patent [19]

Kitaguchi

[11] Patent Number: 4,674,276
[45] Date of Patent: Jun. 23, 1987

[54] INERTIAL SPEED CONTROL COUPLING FOR A GAS TURBINE ENGINE

[75] Inventor: Sam S. Kitaguchi, Phoenix, Ariz.

[73] Assignee: The Garrett Corporation, Los Angeles, Calif.

[21] Appl. No.: 884,320

[22] Filed: Jul. 11, 1986

Related U.S. Application Data

[63] Continuation of Ser. No. 647,944, Sep. 5, 1984, abandoned.

[51] Int. Cl.[4] .............................................. F02C 3/10
[52] U.S. Cl. ................................................. 60/39.163
[58] Field of Search ........................... 60/39.163, 39.2; 24/713, 752 F

[56] References Cited

U.S. PATENT DOCUMENTS

| | | | |
|---|---|---|---|
| 801,730 | 10/1905 | Lofton | 74/713 |
| 2,364,411 | 12/1944 | White | 74/713 |
| 3,507,113 | 4/1970 | Herrmann et al. | 60/39.163 |
| 3,546,879 | 12/1970 | Hass | 60/39.163 |
| 3,874,251 | 4/1975 | Lapitsky | 74/713 |
| 4,282,709 | 8/1981 | Kronsgard | 60/39.163 |

FOREIGN PATENT DOCUMENTS

| | | | |
|---|---|---|---|
| 2439255 | 2/1976 | Fed. Rep. of Germany | 60/39.163 |
| 1276832 | 6/1972 | United Kingdom | 60/39.163 |

Primary Examiner—Louis J. Casaregola
Attorney, Agent, or Firm—Terry L. Miller; Albert J. Miller

[57] ABSTRACT

An inertial coupling is provided for substantially preventing rotational speed variations of a free power turbine in a multiple shaft gas turbine engine in response to a transient load condition. The inertial coupling comprises a gear assembly having first and second rotatable components driven respectively by the free power turbine and by the gas generator section of the gas turbine engine to cooperatively drive a free-wheeling inertial mass. The inertial mass is rotated at a constant speed during steady-state engine operation and provides sufficient rotational inertia during a transient load condition to couple the free power turbine temporarily to the gas generator section to maintain free power turbine speed substantially constant during adjustment of an engine fuel control to accommodate the changed engine load.

28 Claims, 6 Drawing Figures

INERTIAL SPEED CONTROL COUPLING FOR A GAS TURBINE ENGINE

This application is a continuation of application Ser. No. 647,944 filed Sept. 5, 1984 (abandoned).

BACKGROUND OF THE INVENTION

This invention relates generally to improvements in gas turbine engine systems, particularly of the type including a gas turbine engine for driving an electrical generator to provide electrical power. More specifically, this invention relates to an inertial speed control device for use with a multiple shaft gas turbine engine to maintain the output speed thereof substantially constant in response to a transient load condition.

Gas turbine engines have been widely used for driving many different types of rotary equipment, such as an electrical generator to provide a source of electrical power. Typically, the gas turbine engine comprises a compressor and a turbine mounted on a common rotatable shaft in close association with a combustor. The compressor functions on rotation to draw in and compress a charge of air which is supplied to the combustor for admixture with fuel therein. The combined air-fuel mixture is combusted within the combustor to provide a high energy gas outflow for rotatably driving the turbine, thereby rotatably driving the common shaft and the compressor. In accordance with some engine designs, referred to as "single shaft" engines, the common shaft comprises the engine output shaft and is adapted for direct connection to an engine load, such as an electrical generator or the like. In other engine designs characterized generally as "multiple shaft" engines, the high energy gas outflow is further coupled to one or more so-called free power turbines carried by an independently rotatable output shaft adapted for connection to the engine load.

In some gas turbine engine systems, the single shaft engine design may be preferred. More particularly, when operated at or near rated engine speed and load conditions, single shaft gas turbine engines exhibit relatively high engine efficiency and fuel economy. Moreover, the combined rotational inertia of the compressor and turbine on the single common shaft tends to resist variations in engine output speed in response to relatively small changes in engine load. However, the single shaft engine is not well suited for some system applications requiring a substantially constant engine output speed irrespective of changing engine load conditions, such as an electrical power generation system requiring constant output speed to generate electrical power at a prescribed frequency. In such systems, the requisite constant output speed correspondingly requires a relatively high air mass flow through the engine, wherein this high mass flow results in relatively poor efficiency and fuel economy when the engine is operated at power settings significantly below its design rating.

Accordingly, in many turbine engine system applications, the so-called multiple shaft gas turbine engine is used, since the free power turbine or turbines thereof may be rotated at an output speed independent from the rotational speed of the engine compressor. Accordingly, in an electrical power generation system requiring a relatively high and relatively constant output speed throughout a range of engine loads, the free power turbine rotational speed can be maintained constant while the rotational speed of the commonly shafted compressor and turbine can be varied appropriately by adjusting combustor fuel supply to improve overall engine efficiency and fuel economy.

However, the free power turbine of a multiple shaft gas turbine engine is subject to short-term speed variations caused by relatively sudden changes in engine load. For example, a sudden step increase in engine load can cause the power turbine to slow briefly until the combustor fuel supply can be appropriately adjusted to accommodate the change in engine load. Similarly, and perhaps more importantly, a sudden decrease in engine load can cause short-term overspeeding of the free power turbine during fuel supply adjustment to accommodate the changed load. Such overspeeding of the free power turbine is undesirably accompanied by a substantially increased risk of mechanical component failure.

There exists, therefore, a significant need for a speed control device for a multiple shaft gas turbine engine for maintaining the rotational speed of the free power turbine substantially constant during a transient load condition. The present invention fulfills this need and provides further related advantages.

SUMMARY OF THE INVENTION

In accordance with the invention, an inertial speed control coupling is provided for maintaining the output speed of a multiple shaft gas turbine engine substantially constant during a transient load condition, thereby preventing undesired engine over-speeding and/or speed droop. The inertial speed control coupling comprises a gear assembly having rotatable components thereof coupled to the gas generator section and the free power turbine section of the engine, wherein these rotatable components cooperatively drive a free-wheeling inertial mass. During steady-state engine operation, the inertial mass is rotated at a constant speed. During a transient load condition, however, the inertial mass temporarily couples the free power turbine section to the gas generator section for temporarily maintaining engine output speed at a substantially constant level.

In accordance with one preferred form of the invention, the gear assembly of the inertial speed cntrol coupling comprises an epicyclic differential gear assembly having first and second gear components driven respectively by the gas generator and free power turbine sections of the engine. These first and second gear components are meshed with an annular array of orbiting gears carried by an annular cage for rotation about their individual axes and for orbital motion about a central axis of the gear asembly. The free-wheeling inertial mass forms a portion of the cage and is thus rotated with the orbiting gears at a rotational speed constituting a composite of the rotational speeds of the gas generator and free power turbine sections.

During steady-state engine operation, the gas generator and free power turbine sections rotate at constant speeds thereby rotating the inertial mass at a constant speed. During a transient load condition, however, the inertial mass has sufficient rotational inertia to couple the free power turbine section temporarily with the gas generator section to prevent sudden acceleration or deceleration of the free power turbine section throughout a period of time sufficient for an engine fuel control to adjust the rotational speed of the gas generator section to accommodate the change in engine load.

In alternative preferred forms of the invention, the gas generator and free power turbine sections of the engine may be coupled to different rotatable components of an epicyclic differential gear assembly and the inertial mass may be provided as a different portion of the gear assembly. For example, the gas generator and free power turbine sections may be coupled to the orbiting gear cage and the first gear component, respectively, with the free-wheeling inertial mass forming a portion of the second gear component in meshed relation with the orbiting gears at a position opposite the first gear. In such configuration, steady-state engine operation once again results in constant but comparatively higher speed rotation of the inertial mass, thereby providing a relatively higher rotational inertia for temporarily coupling the gas generator and free power turbine sections during a transient load condition.

Other features and advantages of the present invention will become more apparent from the following detailed description, taken in conjunction with the accompanying drawings, which illustrate, by way of example, the principles of the invention.

BRIEF DESCRIPTION OF THE DRAWINGS

The accompanying ddrawngs illustrate preferred embodiments of the invention. In such drawings.

DETAILED DESCRIPTION OF THE PREFERRED EMBODIMENTS

Figure 1:
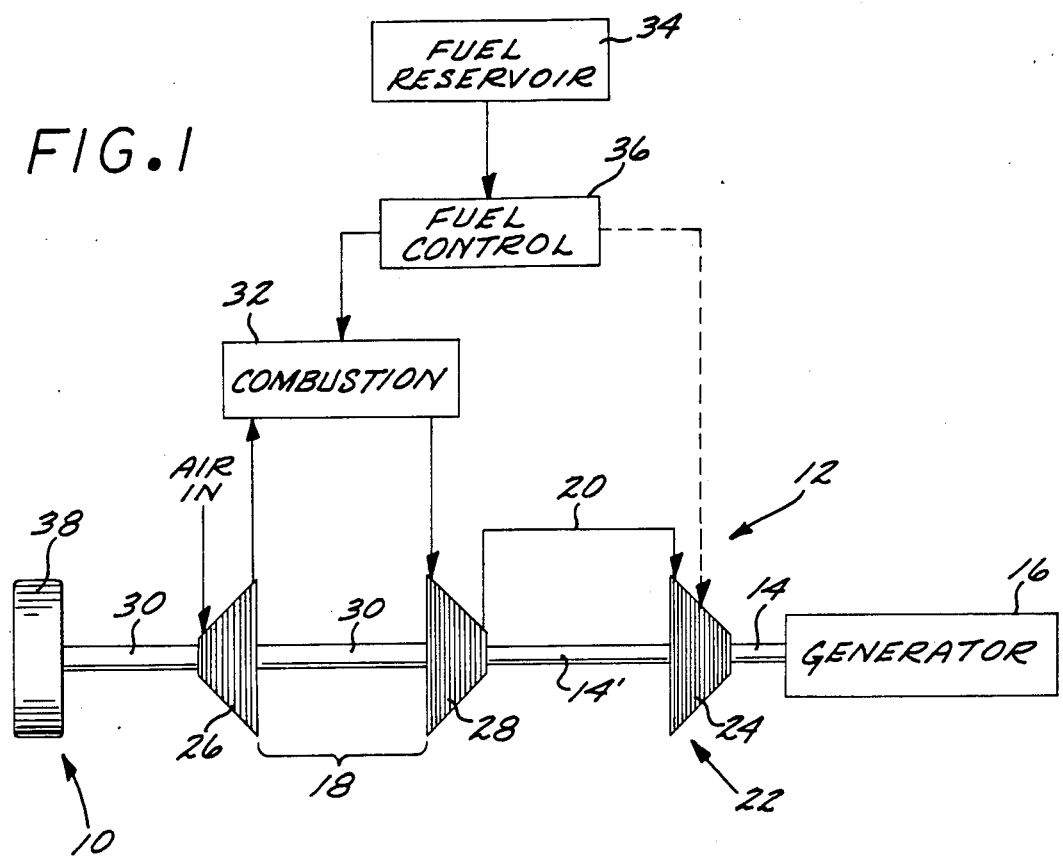
FIG. 1 is a schematic diagram illustrating a gas turbine electrical generation system including an inertial speed control coupling embodying the novel features of the invention.

As shown in the exemplary drawings, an inertial speed control coupling referred to generally by the reference numeral 10 is provided for controlling the output speed of a multiple shaft gas turbine engine 12 having an output shaft 14 for rotatably driving an electrical generator 16 or the like. The inertial speed coupling maintains the rotational speed of the output shaft 14 substantially constant throughout temporary variations in generator load upon the engine 12.

The multiple shaft gas turbine engine 12 shown in FIG. 1 includes a number of conventional turbine engine components and is shown as a portion of an electrical power generation system including the electrical generator 16. The gas turbine engine 12 comprises a so-called gas generator section 18 for producing a relatively high energy gas flow coupled through suitable ducting 20 to a free power turbine section 22 including one or more free power turbines 24 mounted on the engine output shaft 14. The high energy gases rotatably drive the free power turbine 24 to correspondingly drive the electrical generator 16 via the output shaft 14 thereby providing a source of electrical power. Alternatively, other types of rotary equipment may be connected to the output shaft 14, if desired.

The gas generator section includes a compressor 26 and a turbine 28 mounted on a common shaft 30 rotatable independently of the engine output shaft 14. During engine operation, the compressor 26 is rotated by the shaft 30 to draw in and compress a supply of ambient air which is discharged at elevated pressure into a combustor 32. Within the combustor 32, the compressed air is mixed with an appropriate fuel supplied from a fuel reservoir 34 in accordance with operation of a fuel control 36 of known design. The mixed air-fuel is then combusted within the combustor 32 on a continuous flow basis to yield the relatively high energy gas outflow coupled initially to rotatably drive the turbine 28 of the gas generator section 18 to correspondingly drive the compressor 28 through the fcommon shaft 30. The high energy gases are then exhausted through the ducting 20 to the free power turbine section 22 for rotatably driving the engine output shaft 14, as described above.

The inertial speed control coupling 10 of the present invention is mechanically connected directly and continuously to the gas generator section 18 and to the free power turbine section 22 of the engine 12. In the illustrative embodiments of the invention, the inertial coupling 10 is positioned coaxially with the gas generator and free power turbine sections 18 and 22 at one end of the engine 12 opposite the generator 16. The desired mechanical connection to the inertial coupling 10 is achieved by forming the common shaft 30 of the gas generator section 18 with a hollow configuration extending beyond the compressor 26 in a direction away from the generator 16, with the output shaft 14 including an extension section 14' which extends through the shaft 30 for connection to the inertial coupling 10. Alternatively, different mechanical connection arrangements may be used, such as by interposing the inertial coupling 10 coaxially between the gas generator and free power turbine sections 18 and 22.

In accordance with a primary aspect of the invention, the inertial speed coupling 10 includes a free-wheeling inertial mass 38 which is cooperatively driven rotationally by the gas generator and free power turbine sections 18 and 22. During normal steady-state, constant load operation of the turbine engine 12, this free-wheeling inertial mass 38 is rotated at a substantially constant speed which does not affect rotational driving of the gas generator section shaft 30 and the engine output shaft 14 at different selected rotational speeds. Accordingly, in the illustrative power generation system, the gas generator section 18 can be operated by appropriate fuel supply with relatively high efficiency and fuel economy to rotatably drive the free power turbine 24 at a relatively high, substantially constant rotational speed chosen for generation of electrical current at a prescribed frequency. Relatively slow variations in the electrical power load imposed upon the engine may be accommodated by adjustment of the fuel control 36 adapted for load-responsive operation in any known manner. Relatively sudden power load changes which would otherwise cause short-term but undesired changes in the rotational speed of the output shaft 14 are substantially prevented by the inertial spped coupling 10.

More particularly, a relatively sudden step reduction in power load tends to result in short-term overspeeding of the output shaft 14 in response to the mass flow of gases driving the free power turbine 24. While such overspeeding is normally of brief duration until appropriate correction of gas generator section operation by the fuel control 36, an undesirable fluctuation in generated current frequency and an undesirable risk of mechanical engine failure nevertheless result. Alternatively, a sudden increase in power load tends to cause a similarly undesirable short-term decrease in the output shaft rotational speed. However, in the present invention, the free-wheeling inertial mass 38 of the inertial coupling 10 is chosen to provide sufficient rotational inertia for temporarily coupling the output shaft 14 with the gas generator section 18 to resist transient load speed variations of the output shaft.

Figure 2:
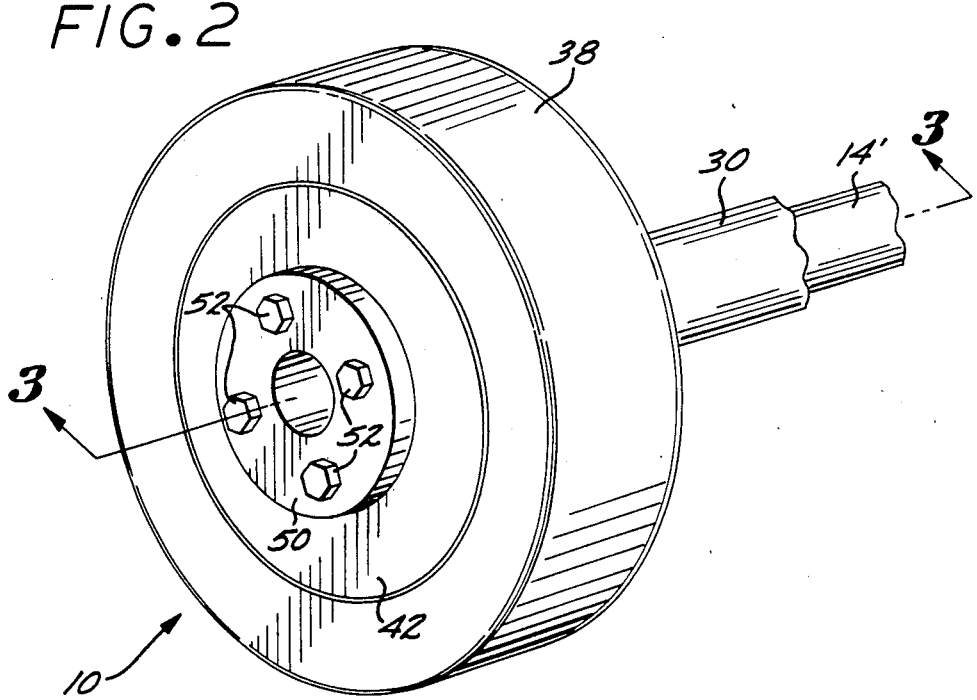
FIG. 2 is an enlarged fragmented perspective view illustrating one preferred form of the inertial coupling.
Figure 3:
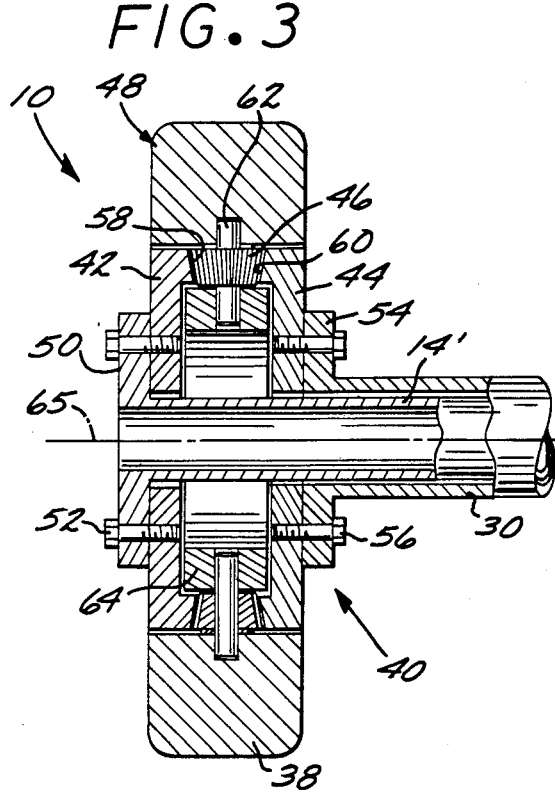
FIG. 3 is a fragmented horizontal sectional view, shown partially in elevation, taken generally on the line 3—3 of FIG. 2.

The inertial speed coupling is shown in more detail in one preferred form in FIGS. 2 and 3. As shown, the coupling 10 comprises an epicyclic differential gear assembly 40 having a first crown gear 42 driven rotatably by the free power turbine section 22 and a second crown gear 44 driven rotatably by the gas generator section 18. The two crown gears 42 and 44 both mesh on opposite sides of an annular array of differential pinion gears 46 supported on a cage 48, wherein the free-wheeling inertial mass comprises a portion of and is rotatable with the differential pinion gear cage 48.

More particularly, as shown best in FIG. 3, the extension 14' of the engine output shaft 14 passes coaxially through the differential gear assembly 40 and terminates in a radially enlarged flange 50 connected as by a plurality of bolts 52 or the like to the outboard face of the crown gear 42. At the opposite axial side of the gear assembly, the gas generator section shaft 30 similarly terminates in a radially enlarged flange 54 adapted for connection to the outboard face of the second crown gear 44 by a series of bolts 56 or the like. The two crown gears 42 and 44 respectively include annular patterns of beveled gear teeth 58 and 60 presented in confronting directions for meshed engagement with opposite sides of the differential pinion gears 46. These differential pinion gears 46 comprise beveled gears and are rotatably supported by individual support pins 62 carried by the cage 48 including an inner annular retainer 64 and the outer free-wheeling inertial mass 38.

During steady-state operation of the gas turbine engine 12, the two crown gears 42 and 44 are rotatably driven typically in the same direction and at normally different rotational speeds. The crown gears thus rotatably drive the differential pinion gears 46 about their individual axes while simultaneously orbiting the pinion gears about a central axis 65 of the differential gear assembly. The orbiting motion of the pinion gears 46 is accompanied by corresponding rotational movement of the differential gear cage 48, including the inertial mass 38. At steady-state operation, the inertial mass 38 is thus rotated at a substantial and constant rotational speed comprising a composite of the speeds of the shafts 14 and 30 and without itself imposing any significant load upon the gas turbine engine.

During a sudden transient load condition, any tendency of the free power turbine section and the engine output shaft 14 to accelerate or decelerate is resisted by the free wheeling inertial mass 38. More specifically, the inertial mass 38 has a rotational inertial sufficiently greater than the rotational inertia of the free power turbine 24 to override the acceleration or deceleration and temporarily couple the free power turbine through the pinion gears 46 to the gas generator section 18. The rotational speed of the output shaft 14 is thus temporarily maintained by the inertial coupling 10 throughout a short-term transition period during which the engine fuel control 36 adjusts operation of the gas generator section to accommodate the shift in engine load.

More particularly, by way of example, the output shaft 14 and the free power turbine 24 tend to accelerate in response to a sudden reduction in power load because of the mass of high energy gases in the duct 20 and the gas generator section 18 (FIG. 1). As described above, this acceleration is resisted by the inertial coupling 10 while the fuel control 36 reduces fuel flow to correspondingly reduce the rotational speed of the gas generator section 18, thereby reducing engine mass air flow to accommodate the reduced load. Consequently, it will be appreciated that transient acceleration of the free power turbine 24 above the chosen speed must also result in acceleration of the inertial mass 38, with speed of the gas generator section 18 remaining temporarily constant. Thus, the rotational inertia of mass 38 resists transient speed changes of free power turbine 24. Further, acceleration of free power turbine 24 which tends to accelerate the inertial mass 38 also tends to change the rotational speed of the gas generator section 18 because of the gear coupling provided by crown gears 42, 44 and the differential pinion gears 46. Of course, such transient change of rotational speed is resisted by the rotational inertia of the gas generator section 18. Accordingly, transient speed changes of free power turbine 24 are resisted by the mass 38 of coupling 10, and also by the rotational inertia of gas generator 18 coupled via the gear assembly 40. With the passage of the time following a sudden change in power load, the fuel control 36 will accommodate the new power load condition imposed upon the gas generator section 18, and a new steady-state condition will be reached. Alternatively, during an increased transient load condition, the opposite effect occurs to maintain output shaft speed at the desired substantially constant level.

A variety of modified versions of the epicyclic differential gear assembly forming the inertial coupling 10 are possible without altering the basic structure and function of the coupling. Three of such modified versions are shown by way of example in FIGS. 4, 5, and 6. Conveniently, for ease of reference to the above-described embodiment of FIGS. 2 and 3, corresponding coupling components depicted in FIGS. 4, 5, and 6 are designated by common reference numerals increased in magnitude by 100, 200, and 300, respectively.

Figure 4:
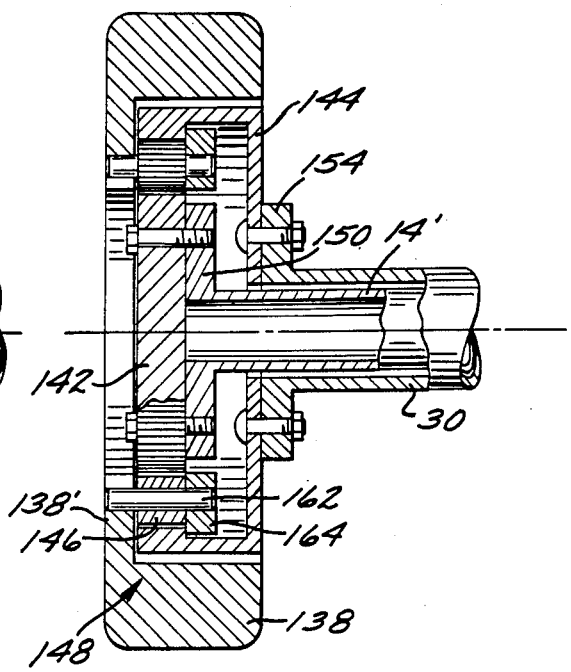
FIG. 4 is a fragmented horizontal sectional view generally similar to FIG. 3 but illustrating the inertial coupling in one modified form.

As shown in FIG. 4, the extension 14' of the engine output shaft includes an enlarged end flange 150 for connection to an externally toothed sun gear 142. This sun gear 142 is positioned for meshed engagement with an annular series of mating planet gears 146 which are rotatably supported by support pins 162 anchored within an annular retainer 164 and a radially inwardly projecting flange 138' of a free-wheeling inertial mass 138. The inertial mass 138 and retainer 164 cooperate to define an annular cage 148 supporting the planet gears in continuous meshed relation with a ring gear 144 secured in turn to a flange 154 on the gas generator shaft 30. The embodiment of FIG. 4 functions during engine operation to resist engine output speed changes in response to sudden transient load conditions in the same manner as described previously with respect to the embodiment of FIGS. 2 and 3.

Figure 5:
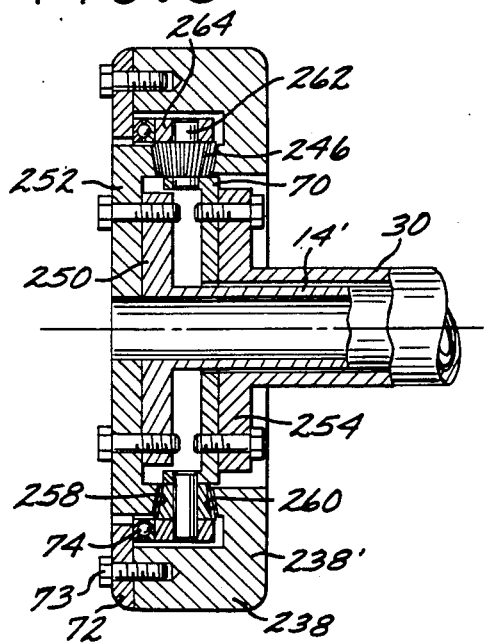
FIG. 5 is a fragmented horizontal sectional view generally similar to FIG. 3 but illustrating the inertial coupling in an alternative preferred form.
Figure 6:
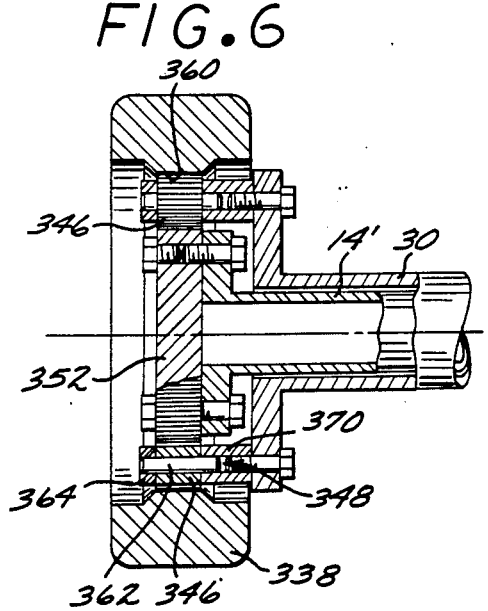
FIG. 6 is a fragmented horizontal sectional view generally similar to FIG. 3 but illustrating the inertial coupling in a still further modified form.

As shown in FIG. 5, the output shaft extension 14' has its enlarged end flange 250 secured to a first crown gear 252 having an annular array of beveled gear teeth 258. These teeth 258 are meshed with beveled pinion gears 246 which are rotatable about individual support pins 262 anchored within an outer retainer 264 and an inner ring 70 secured to the enlarged flange 254 on the gas generator section shaft 30. Accordingly, in this version, the pinion gears 246 are supported for orbiting movement with the gas generator section shaft 30. The second crown gear for the differential gear assembly is defined by the free-wheeling inertial mass 238 which includes an inwardly projecting flange 238' having beveled teeth 260 in meshed engagement with the pinion gears 246. For stability, retainer plate 72 may be fastened by bolts 73 or the like into one side of the inertial mass 238, and an appropriate bearing unit 74 interposed between the retainer plate 72 and the cage retainer 264 to maintain the second crown gear teeth 260 in engagement with the pinion gears.

In the FIG. 5 embodiment, the overall function and operation of the gear assembly remains the same. However, the inertial mass 238 is rotatably driven at a relatively higher speed for given speeds of the shafts 14' and 30 in comparison with the embodiments of FIGS. 2-4. The inertial mass 238 thus provides a higher rotational inertia to better resist output shaft speed changes during transient load conditions, or, alternatively, a smaller mass for the inertial mass 238 may be used to provide the same comparable rotational inertia.

In the embodiment of FIG. 6, the differential gear assembly generally corresponds with FIG. 4. More particularly, the output shaft extension 14' is connected to an externally toothed sun gear 352 which is meshed with the annular series of planet gears 346. These planet gears 346 are supported by individual support pins 362 captured within an annular cage 348 including a retainer 364 and a mounting ring 370 coupled to the gas generator section shaft 30. The ring gear for the planetary system is provided by the inertial mass 338 having an inner annular array of teeth 360 in meshed relation with the planet gears 346.

Once again, as in the previous embodiments, the inertial mass 338 is rotatably driven in a free-wheeling manner at a speed representing a composite of the gas generator section and free power turbine speeds. The inertial mass 338 functions during a transient load conditon to resist speed changes of the engine output shaft during a transition period of adjustment of engine fuel supply.

The inertial speed control coupling of the present invention thus provides a relatively simple yet effective device for enhacing the operation of a multiple shaft gas turbine engine in operating environments requiring constant output speed notwithstanding load transients. The inertial coupling 10 does not interfere with normal steady-state operation of the engine but temporarily alters engine operation to more closely resemble a single shaft engine for the duration of a transient load condition.

A variety of further modifications and improvements to the invention described herein will be apparent to those of ordinary skill in the art. Accordingly, no limitation on the invention is intended by way of the description herein, except as set forth in the appended claims.

What is claimed is:

1. In a gas turbine engine having a gas generator section for producing a flow of high energy gases and a free power turbine section driven by said gases for rotatably driving an engine load, a speed control device, comprising:
an epicyclic gear assembly having a first gear, a second gear, an annular array of differential gears meshed between said first and second gears, and a cage supporting said differential gears for rotation about their individual axes and for orbital motion about the rotational axes of said first and second gears;
said first gear being connected to and rotatably driven by the free power turbine section;
one of said second gear and cage being connected to and rotatably driven by the gas generator section;
said other of said second gear and cage including an inertial mass and being cooperatively driven by said one of said second gear and cage and by said first gear at a substantially constant speed during steady-state engine operation, said inertial mass having a rotational inertia substantially greater than the rotational inertia of the free power turbine section to couple the free power turbine section to the gas generator section to temporarily resist rotational speed change of the free power turbine section during a transient load condition.

2. The speed control device of claim 1 wherein said cage is connected to and rotatably driven by the gas generator section, said second gear including said inertial mass.

3. The speed control device of claim 1 wherein the engine load comprises an electrical generator.

4. In a gas turbine engine having a gas generator section for producing a flow of high energy gases and a free power turbine section driven by said gases for rotatably driving an engine load, a speed control device, comprising:
a coupling assembly having a first rotatable component for driving by the free power turbine section, a second rotatable component for driving by the gas generator section, and a free-wheeling third rotatable component driven cooperatively by said first and second rotatable components, said free-wheeling third component being otherwise free of torque transmitting connections;
said third rotatable component including an inertial mass having a rotational inertia substantially equal to or greater than that of the free power turbine section;
said third rotatable component being rotatably driven at a substantially constant speed during steady-state engine operation and having sufficient rotational inertia during a transient load condition to couple the free power turbine section temporarily with the gas generator section to maintain the rotational speed of the free power turbine section substantially constant.

5. The speed control device of claim 4 wherein said coupling assembly comprises an epicyclic gear assembly.

6. The speed control device of claim 5 wherein said epicyclic gear assembly comprises a planetary gear assembly.

7. The speed control device of claim 6 wherein said first rotatable component comprises a sun gear, wherein said second rotatable component comprises a ring gear, and wherein said third rotatable component comprises an annular cage supporting a plurality of planet gears in meshed relation between said sun and ring gears.

8. The speed control device of claim 6 wherein said first rotatable component comprises a sun gear, wherein said second rotatable component comprises a cage supporting an annular array of planet gears meshed with said sun gear, and wherein said third rotatable component comprises a ring gear meshed with said planet gears.

9. The speed control device of claim 5 wherein said first rotatable component comprises a first crown gear, wherein said second rotatable component comprises a second crown gear, and wherein said third rotatable component comprises an annular cage supporting a plurality of pinion gears in meshed relation between said first and second crown gears.

10. The speed control device of claim 5 wherein said first rotatable component comprises a first crown gear, wherein said second rotatable component comprises an annular cage supporting a plurality of pinion gears meshed with said first crown gear, and wherein said third rotatable component comprises a second crown gear meshed with said pinion gears.

11. The speed control device of claim 4 wherein the engine load comprises an electrical generator.

12. The speed control device of claim 4 wherein said inertial mass has a rotational inertia substantially greater than the rotational inertia of the free power turbine section.

13. In a gas turbine engine having a gas generator section for producing a flow of high energy gases and a free power turbine section driven by said gases for rotatably driving an engine load, a speed control device, comprising:
 an epicyclic gear assembly having a first gear, a second gear, an annular array of differential gears meshed between said first and second gears, and a cage supporting said differential gears for rotation about their individual axes and for orbital motion about the rotational axes of said first and second gears;
 means for connecting said first gear to the free power turbine section for rotatable driving thereby;
 means for connecting one of said second gear and cage to the gas generator section for rotatable driving thereby, the other of said second gear and cage free-wheeling between said first gear and said one of said second gear and cage and being otherwise free of torque transmitting connections;
 said other of said second gear and cage including an inertial mass having a rotational inertia substantially equal to or greater than that of the free power turbine section and sufficient during a transient load condition of the free power turbine section to maintain temporarily the rotational speed of the free power turbine section.

14. In a gas turbine engine having a gas generator section for producing a flow of high energy gases and a free power turbine section driven by said gases for rotatably driving an engine load, an inertial speed control coupling, comprising:
 a first gear for rotatable driving by the free power turbine section;
 a second gear;
 an annular array of differential gears meshed between said first and second gears;
 a cage supporting said differential gears for rotation about their individual axes and for movement with said differential gears rotationally about the rotational axis of said first and second gears;
 one of said second gear and cage being for rotatable driving by the gas generator section and the other comprising a free-wheeling inertial mass which has a rotational inertia substantially equal to or greater than that of the free power turbine section and which is otherwise free of torque transmitting connections;
 said inertial mass being rotatably driven at a substantially constant speed during steady-state engine operation and having sufficient rotational inertia during a transient load condition for at least temporarily maintaining the rotational speed of the free power turbine section substantially constant.

15. The speed control coupling of claim 14 wherein said first and second gears comprise confronting first and second crown gears including beveled gear teeth, said differential gears comprising bevel gears meshed between the beveled gear teeth of said first and second gears.

16. The speed control coupling of claim 15 wherein said first gear has a generally circular shape with gear teeth on the outer diameter thereof, and said second gear has a generally annular shape with gear teeth on the inner diameter thereof, said differential gears being disposed in an annular array generally concentrically between said first and second gears.

17. The speed control coupling of claim 15 wherein said cage includes first and second annular retainer members, and a plurality of support pins coupled between said first and second retainer members, each of said support pins rotatably supporting a respective one of said plurality of differential gears.

18. The speed control coupling of claim 17 wherein said first and second retainer members are axially spaced from each other.

19. The speed control coupling of claim 17 wherein said first and second retainer members are radially spaced from each other.

20. A gas turbine engine system, comprising:
 a gas generator section including a compressor and a first turbine on a common shaft, a combustor, means for supplying fuel to the combustor, and means for supplying air to said combustor for mixture and combustion with the fuel to supply a flow of high energy gases for rotatably driving said first turbine;
 a free power turbine secion including at least one power turbine rotatably carried by an engine output shaft adapted for rotatably driving an engine load;
 means for supplying the high energy gas flow to said free power turbine section for rotatably driving said free power turbine and said output shaft; and
 an inertial speed control coupling including a first rotatable component driven by said free power turbine section, a second rotatable component driven by said gas generator section, and a third rotatable component including an inertial mass having a rotational inertia substantially equal to or greater than that of the free power turbine section driven cooperatively by said first and second components and otherwise free of torque transmitting connections;
 said third rotatable component being driven at a substantially constant speed during steady-state engine operation and having sufficient rotational inertia during a transient load condition to couple said output shaft at least temporarily with said common shaft to maintain the rotational speed of said output shaft substantially constant.

21. The gas turbine engine system of claim 20 further including an electrical generator driven by said output shaft.

22. The gas turbine engine system of claim 20 wherein said first, second, and third rotatable components comprise an epicyclic gear assembly.

23. The gas turbine engine system of claim 22 wherein said first rotatable component comprises a sun gear, wherein said second rotatable component comprises a ring gear, and wherein said third rotatable component comprises an annular cage supporting a plurality of planet gears in meshed relation between said sun and ring gears.

24. The gas turbine engine system of claim 22 wherein said first rotatable component comprises a sun gear, wherein said second rotatable component comprises a cage supporting an annular array of planet gears meshed with said sun gear, and wherein said third rotatable component comprises a ring gear meshed with said planet gears.

25. The gas turbine engine system of claim 22 wherein said first rotatable component comprises a first crown gear, wherein said second rotatable component comprises a second crown gear, and wherein said third rotatable component comprises an annular cage supporting a plurality of pinion gears in meshed relation between said first and second crown gears.

26. The gas turbine engine system of claim 22 wherein said first rotatable component comprises a first crown gear, wherein said second rotatable component comprises an annular cage supporting a plurality of pinion gears meshed with said first crown gear, and wherein said third rotatable component comprises a second crown gear meshed with said pinion gears.

27. The turbine engine system of claim 22 wherein said inertial mass has a rotational inertia substantially greater than the rotational inertia of the free power turbine section.

28. In a gas turbine engine having a gas generator section for producing a flow of high energy gases and a free power turbine section driven by said gases for rotatably driving an engine load, a speed control device, comprising:

an epicyclic gear assembly having a first gear, a second gear, an annular array of differential gears meshed between said first and second gears, and a cage supporting said differential gears for rotation about their individual axes and for orbital motion about the rotational axes of said first and second gears;

said first gear being connected to and rotatably driven by the free power turbine section;

one of said second gear and cage being connected to and rotatably driven by the gas generator section;

said other of said second gear and cage including an inertial mass and being cooperatively driven by said one of said second gear and cage and by said first gear at a substantially constant speed during steady-state engine operation, said inertial mass having a rotational inertia substantially greater than the rotational inertia of the free power turbine section to couple the free power turbine section to the gas generator section to temporarily resist rotational speed change of the free power turbine section during a transient load condition;

said second gear being connected to and rotatably driven by the gas generator section, said cage including said inertial mass.

* * * * *